(12) United States Patent
Stewart

(10) Patent No.: US 7,840,838 B2
(45) Date of Patent: *Nov. 23, 2010

(54) RAPID REGENERATION OF FAILED DISK SECTOR IN A DISTRIBUTED DATABASE SYSTEM

(75) Inventor: William K. Stewart, Lexington, MA (US)

(73) Assignee: Netezza Corporation, Framingham, MA (US)

( * ) Notice: Subject to any disclaimer, the term of this patent is extended or adjusted under 35 U.S.C. 154(b) by 396 days.

This patent is subject to a terminal disclaimer.

(21) Appl. No.: 11/897,332

(22) Filed: Aug. 30, 2007

(65) Prior Publication Data

US 2007/0300101 A1    Dec. 27, 2007

Related U.S. Application Data

(63) Continuation of application No. 10/776,031, filed on Feb. 10, 2004, now Pat. No. 7,281,160.

(60) Provisional application No. 60/446,364, filed on Feb. 10, 2003.

(51) Int. Cl.
*G06F 11/00* (2006.01)
(52) U.S. Cl. .............................. 714/8; 714/7
(58) Field of Classification Search ................ 714/8, 714/6, 7, 10, 11, 23, 710, 711
See application file for complete search history.

(56) References Cited

U.S. PATENT DOCUMENTS

| 5,159,671 | A | 10/1992 | Iwami |
| 5,166,936 | A | 11/1992 | Ewert et al. |
| 5,271,018 | A | 12/1993 | Chan |
| 5,974,544 | A | 10/1999 | Jeffries et al. |
| 6,043,945 | A | 3/2000 | Tsuboi et al. |
| 6,088,815 | A | 7/2000 | West et al. |
| 6,327,679 | B1 | 12/2001 | Russell |
| 6,470,461 | B1 | 10/2002 | Pinvidic et al. |
| 6,754,770 | B2 * | 6/2004 | Kang et al. .................. 711/114 |
| 6,795,895 | B2 | 9/2004 | Merkey et al. |
| 6,925,580 | B2 | 8/2005 | Hoskins |
| 6,941,488 | B2 | 9/2005 | Ng et al. |
| 6,993,679 | B2 | 1/2006 | George |
| 7,281,160 | B2 * | 10/2007 | Stewart .......................... 714/8 |
| 2001/0048567 | A1 | 12/2001 | Chng et al. |
| 2002/0032881 | A1 | 3/2002 | Ng et al. |

OTHER PUBLICATIONS

Kari, H., et al., "Analysis of Repair Algorithms for Mirrored-Disk Systems," *IEEE Transactions of Reliability*, 46(2) pp. 193-200, Jun. 1997.

* cited by examiner

*Primary Examiner*—Dieu-Minh Le
(74) *Attorney, Agent, or Firm*—Hamilton, Brook, Smith & Reynolds, P.C.

(57) ABSTRACT

A technique for read error failover processing in a mirrored disk system such as a Redundant Array of Inexpensive Disks (RAID) system, where individual disk units perform Logical Block Address (LBA) remapping. A read error causes a disk controller to report an "unrecoverable" read error to a RAID controller. After receiving this report of an unrecoverable read error, rather than simply switching over to a mirror, the RAID controller first checks to see whether the disk that caused the error can successfully reassign an LBA. In particular, the RAID controller can retrieve the data that was associated with the failed LBA from the mirror, and then write that data to the offending disk. Only if this process does not succeed is the offending disk then treated by the RAID controller as having failed sufficiently to require failover to the mirror.

16 Claims, 5 Drawing Sheets

$M_X$ IS MIRROR OF $P_X$
$LBA_i$ ON $P_X$ HAS SAME DATA AS
$LBA_j$ tk ON $M_X$, WHERE k=m/z

RAPID REGENERATION OF FAILED DISK SECTOR IN A DISTRIBUTED DATABASE SYSTEM

RELATED APPLICATIONS

This application is a continuation application of U.S. application Ser. No. 10/776,031, entitled "Rapid Regeneration of Failed Disk Sector in a Distributed Database System", filed on Feb. 10, 2004, now U.S. Pat. No. 7,281,160 which claims priority to U.S. Provisional Application No. 60/446,364 entitled "Rapid Regeneration of Failed Disk Sector in a Distributed Database System", filed on Feb. 10, 2003. The entire teachings of the above applications are incorporated herein by reference.

BACKGROUND OF THE INVENTION

The present invention relates to a technique for avoiding the abandonment of a disk in a mirrored disk storage system when a disk sector becomes unreadable. The technique may be used to improve reliability in distributed databases or other high reliability storage systems that make use of multiple physical disks.

Data processing systems increasingly require access to greater and greater amounts of storage space. Many high end systems, such as web servers and database systems, are used for storing information to which constant access that is critical to the operation of an enterprise. It is thus extremely important that the users of these systems not be denied service for extended periods of time, and it is quite desirable that as many errors as possible can be fixed without requiring user intervention, or worse, having to shut down or remove the system from active service.

It is now quite common for various data recovery techniques to be implemented, even right on the disk hardware itself. One common failure occurs when a sector on a single track goes bad. A bad sector is one that does not reliably accept or provide data, generally due to a failure of the underlying electromagnetic media. To accommodate sector failures, modern disk units typically provide at least one spare sector per track. This permits remapping of sectors without losing a significant amount of the remaining disk space or which is still good. A disk controller contained in the disk unit itself and/or associated closely with the disk contains firmware to perform such remapping of sectors.

In a typical scenario, a disk may be arranged in 512 byte sectors. Each sector on the disk is identified by the disk controller referencing its physical location, such as by track number and/or sector number. However, most disk controllers now assign a unique Logical Block Address (LBA) to most if not all of the physical disk sectors. Read and write commands to the disk thus access a sector by calling out its location via the LBAs and not by the physical locations. The LBAs typically run contiguously from zero up to some number, m. The disk controller generally assigns LBAs to physical sectors in such a way that sequentially accessing LBAs results in the fastest possible access time.

As alluded to previously, the disk controller typically reserves several spare sectors, generally spreading the spare sectors across the disk rather than concentrating them in one area. If a sector becomes inaccessible, the disk controller maintains a mapping table whereby each sector's LBA can be reassigned to one of the spare sectors. In this manner, the user of the disk (typically the operating system or other application software) need not keep track of which sectors are defective—all LBAs in the range 0-m are always "guaranteed" to be good.

If the application software then attempts to write to a LBA and the disk controller determines that the sector to which the LBA points is defective, the disk controller reassigns the LBA (unbeknownst to the application) to a spare sector. The only possible affect on the application is a slight delay on redirecting the access. Subsequent reads or writes to that LBA generally will not be as fast as before, since the replacement sector will not be adjacent to the sectors pointed to by the previous and following LBAs. If the sector is physically nearby, however, the increase in access time will not be that great. This is one reason for scattering spare sectors throughout the disk rather than grouping them all in one region.

Read failures cannot be handled quite as smoothly, however. If a read attempt to a particular LBA results in an error, the data in that physical sector is now irretrievably lost. In that case, the disk controller notifies the application that an unrecoverable read error has occurred, and reassigns that LBA to a spare sector as in the case of a write error. Thus, future accesses to that LBA will be valid again, in furtherance of the abstraction that all LBAs in range of 0-m are guaranteed to be good. After receiving an unrecoverable read error, if the application has archived the data for the inaccessible sector elsewhere, the application can now take steps to rewrite the block. The data will now be stored in a new, non-defective sector; and the application can then now continue as if the error had not occurred.

The rate of unrecoverable read errors varies among disks and typically with age and environmental conditions such as temperature and vibration. It is rarely zero. Thus disk applications must be able to tolerate occasional data loss. Fundamentally, disk data must typically be able to be regenerated in some fashion, usually by retrieving an archived copy of the data. High performance storage systems use multiple redundant disks to minimize the frequency of retrieval from archives.

One such multi-disk storage system that achieves fault tolerance is known as Redundant Array of Inexpensive Disks (RAID). One commonly used RAID technique its so-called RAID Level 1 that consists of an array of an even number of disks, half of which mirror the other half. For example, in a system with 8 total disks, numbered disks 2, 4 6 and 8 contain exact copies of the data on disks numbered 1, 3, 5, and 7. In another possible implementation of RAID 1, each disk is partitioned, with one half of each disk mirroring the other half of another disk.

When a disk sector in an array system fails or becomes inaccessible, the storage system redirects all accesses destined for the failed disk to the mirror. After the failed disk has been replaced, and its contents restored as necessary from the mirror, the storage system can then redirect accesses destined for the failed disk to its replacement instead of to the mirror. In this fashion the storage system remains operational despite occasional disk failures.

Some have recognized that disk sector repair methods may be used in connection with mirrored disk arrays. For example, in Kari, et al., "Analysis of Repair Algorithms for Mirrored Disk Systems", IEEE Transactions on Reliability, vol. 46, no. 2, June 1997, pp. 193-200, it was recognized that most modern disk units are arranged for handling sector faults internally, by their associated disk controllers remapping LBAs, and that a faulty sector can be replaced using one of the spare. However, there is no particular discussion in that paper of how to handle unrecoverable read errors in connection with such disk repair processes, while avoiding the need to replace an entire disk with its mirror.

SUMMARY OF THE INVENTION

The present invention is a solution to a special case of handling a disk failure problem in a way that provides a more efficient solution than a standard RAID 1 system, and avoids the need to failover to the mirror in the event of an unrecoverable read error.

In particular, common practice in many RAID 1 storage systems is to abandon a disk if an unrecoverable read error occurs. This has been considered to be the appropriate response to a gross disk failure such as when an entire disk has become unusable. However, this approach is needlessly wasteful and disruptive in the case of an unrecoverable read failure which may only be the result of a single storage location on the disk being defective. Because such sector errors are far more common than gross disk failures, their handling an RAID 1 storage system has been inefficient to date.

The present invention modifies what happens when an unrecoverable read error is reported from a disk controller. Rather than simply switch over to the mirror, additional steps are taken by a RAID controller to determine if a sector can be recovered by the underlying disk controller. First, the RAID controller retrieves the data that has become unrecoverable from a disk that mirrors the failed primary. Data is then attempted to be written back to the primary. If the write is successful, then the primary is not abandoned. Optionally, a read-after-write operation can be performed on the primary to confirm successful recovery.

These steps then give the disk controller associated with the offending primary disk the opportunity to reassign the logical block address that maps to the sector which caused the error. If the reassign is successful, the primary disk can thus be salvaged in many instances.

The invention provides many advantages over standard recovery model in RAID 1 processing. First, a primary is more likely to remain in service. Unlike standard RAID recovery processing, the primary is quickly recovered and replacement avoided.

Secondly, reduction in disk array performance is avoided. The standard RAID 1 regeneration process requires extra time to access the mirror, in addition to the overhead needed to regenerate the abandoned disk's replacement.

More particularly, the invention is implemented by changing the bad disk failover processing in the RAID controller. Instead of treating unrecoverable read errors the same as gross disk failures, the RAID controller first checks to see whether the disk that caused the error can successfully reassign an LBA. If, after reassignment of the LBA, the LBA is usable, the system can then retrieve the data that was stored at that LBA from the mirror, write that data to the offending disk only for the originally failed LBA, and, optionally, retry the original read operation. Only if this process does not succeed is the offending disk then treated as having failed sufficiently to require failover to the mirror.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of example embodiments of the invention follows.

The present invention is a disk error recovery scheme for a mirrored disk system. The invention can be used in a number of applications; what will be described here is its use in a distributed database system, although the invention can be quite useful in file servers, web servers, and other systems that may have arrays of redundant disks.

Figure 1:
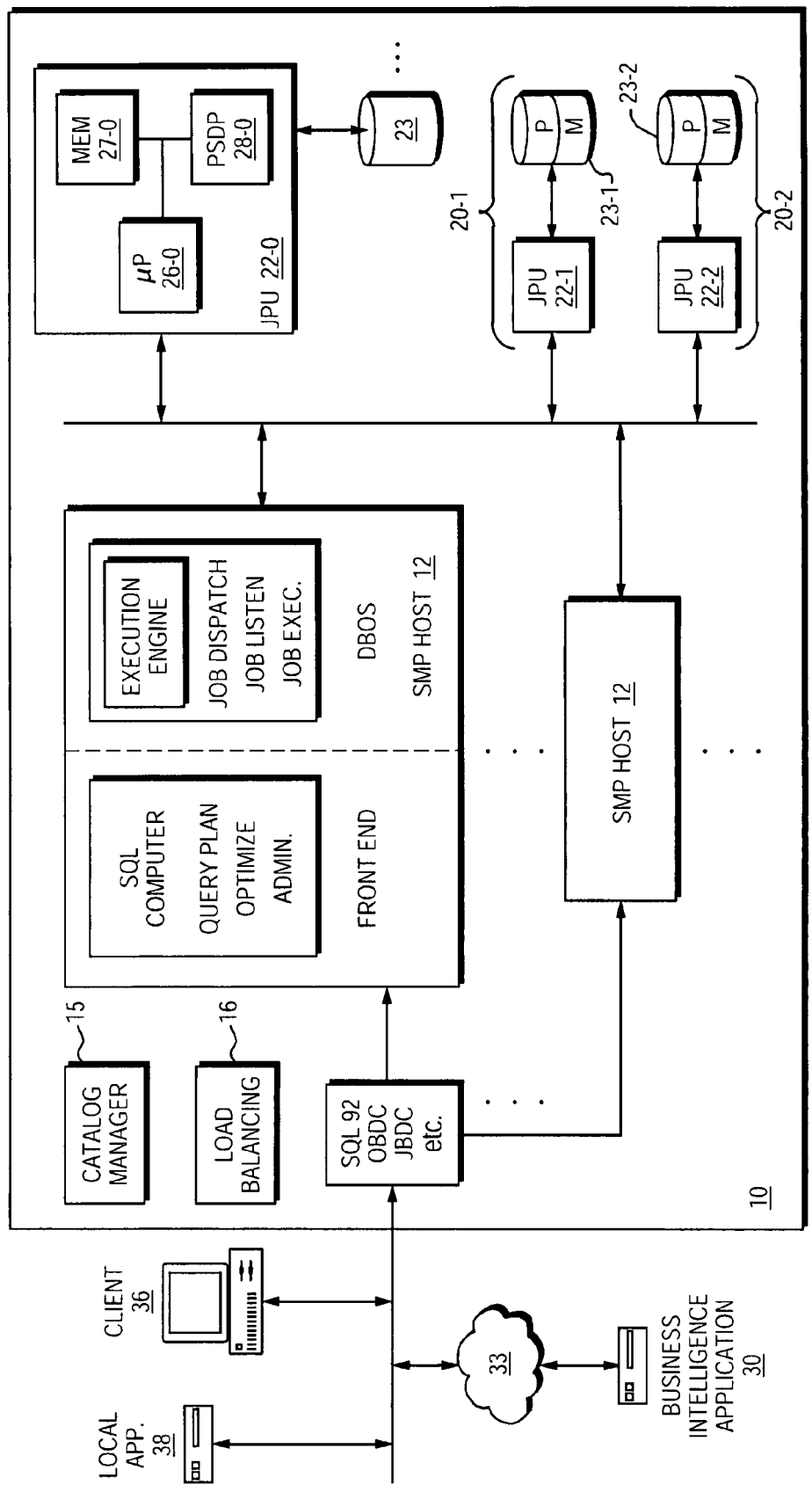
FIG. 1 is a system level block diagram of an application, such as a distributed database system, that makes the use of a disk repair technique according to the present invention.

As more particularly shown in FIG. 1, a database system 10 consists of one or more host computers 12, each with its own memory, network interface, and local storage (not shown in FIG. 1). Each host 12 runs its own operating system, and typically, but not necessarily, each host 12 uses the same type of operating system as the other hosts 12. The hosts 12 may be arranged in a Symmetric Multiprocessing (SMP) topology, for example.

The hosts 12 typically accept queries that are requests for data stored on mass storage devices, such as hard disk drives 23. Queries are typically provided in a format such as Structured Query Language (SQL), Open DataBase Connectivity (ODBC), Java DataBase Connectivity (JDBC), or the like. Hosts 12 develop and optimize a query execution plan which typically consists of one or more data processing jobs to be processed by other elements distributed throughout the system. The requests may originate from any number of business applications that may reside on local processors 28, client computers 36, or separately running remote application software 30 that may access the host 12 through a computer network 33. An execution engine portion of the host 12 develops a plan and then dispatches jobs to CPUs 26, Programmable Streaming Data Processors (PSDPs) 28 and other system components.

The plans generally retrieve, modify, create and/or delete data stored on disks 23 and the schema for such data. The hosts 12 also accept requests to start, commit, and rollback transactions against the data stored on the disks 23. The hosts 12 also perform typical administrative functions such as reporting on the status of the system 10, start and shutdown operation, backing up the current state of the data, restoring previous states of the data, replicating the data, and performing maintenance operations.

Figure 2:
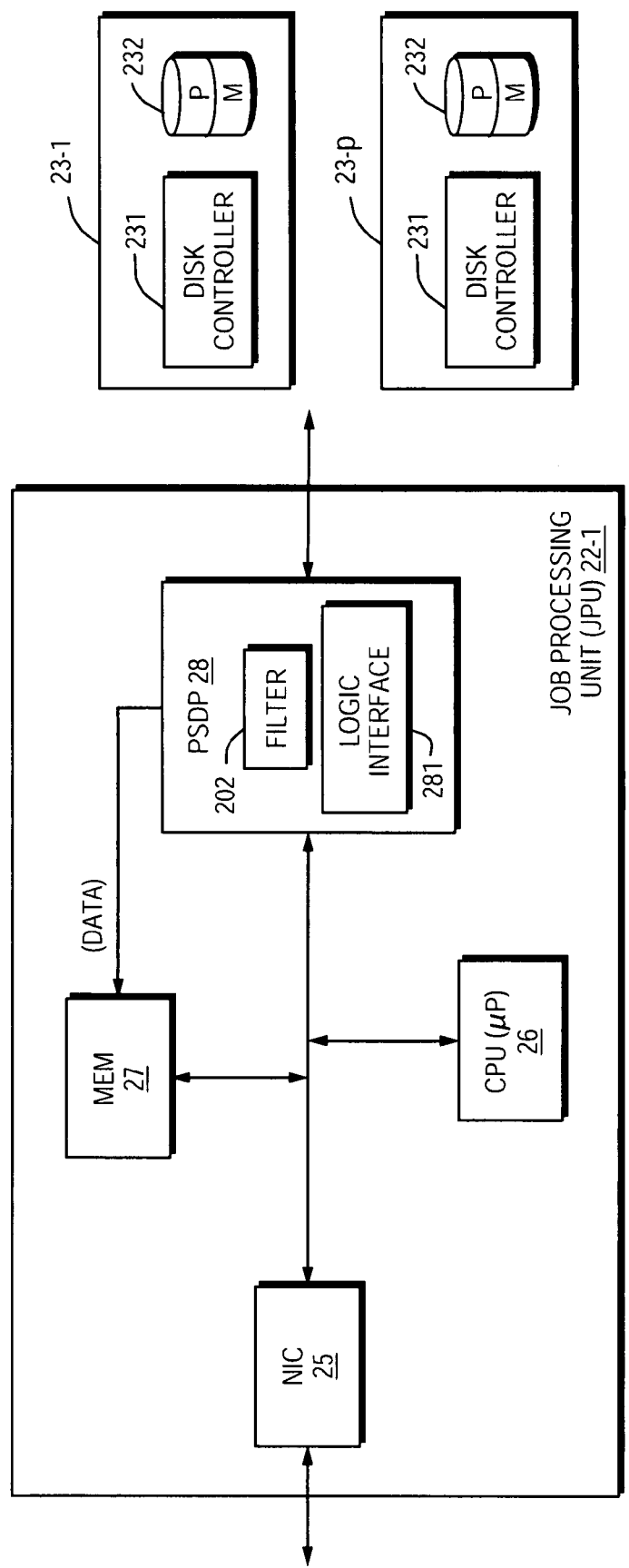
FIG. 2 is a more detailed view of a Job Processing Unit (JPU) that carries out Redundant Array Independent Disk (RAID) level one type processing.

A catalog management component 15 contains descriptions of the fields and layout of data on the disks 23. Catalog management 15 also contains information about which users and applications have which permissions to operate in which ways and on which types of records, datasets, and relations Other data processors in the system are referred to as Job Processing Units (JPUs) 22. As shown in FIG. 2, each JPU 22 consists of a network interface 25 for receiving database commands and delivering replies to the hosts 12, a general purpose Central Processing Unit (CPU) 26 such as a microprocessor, a memory 27, and a custom integrated circuit known as a Programmable Streaming Data Processor (PSDP) 28. Each JPU 22 also has one or more mass storage devices, such as a disk 23, attached from which the JPU 22 may read data. One of the functions of the JPUs is to act as a RAID controller.

In addition to processing jobs received from the hosts 12, a JPU 22 also accepts and responds to requests from hosts for other operations such as:

Start, pre-commit, commit, abort, and recover transactions
Start, initialize, reinitialize, stop, and retrieve status information
Create, modify, or delete descriptions of records, indices, views and other metadata
The JPUs also
Perform mirroring or other replication operations (e.g., RAID processing), and
Redistribute data from one JPU to another It is the last two functions which are of most interest to the present invention.

More details of the preferred autonomous, asynchronous nature of this distributed processing system and the configurations of the JPUs 22 and hosts 12 can be found in a co-pending U.S. Patent Application reference above, entitled "Programmable Data Streaming Architecture Having Autonomous and Asynchronous Job Processing Unit," filed on Sep. 18, 2003 as U.S. patent application Ser. No. 10/667,128 which is hereby incorporated by reference.

In general, each JPU 22 has a PSDP 28 which interfaces to an associated disk 23. The data is read off the disk through the associated PSDP 28, which parses the block data and then filters records of interest and fields of interest within those records before returning it to the host 12.

Although FIG. 1 implies that only a single disk was associated with each JPU, it should be understood that for example, as shown in FIG. 2 more than one physical disk unit 23-1, 23-p may be associated with each JPU 22.

FIG. 2 also shows that each disk unit 23 consists of a physical recording media 232 as well as a disk controller 231. Although this arrangement is not critical to the present invention, most modern disk units integrate the disk controller 231 and media 232 in a common hardware assembly.

The disk controller 231 is responsible for coordinating low level read and write operations. Important for the purposes of the present invention is to note that the disk controller 231 is capable of handling certain types of errors, by remapping addresses of failed disk sectors using Logical Block Addresses (LBAs), in a manner to be described more fully below.

More particularly, the JPU 22 reads and writes data on the disk 23, typically by setting up long data transfers between contiguous regions on the disk and contiguous regions (either real or virtual) in the JPU's memory 27, a process usually referred to as Direct Memory Access (DMA).

Figure 3:
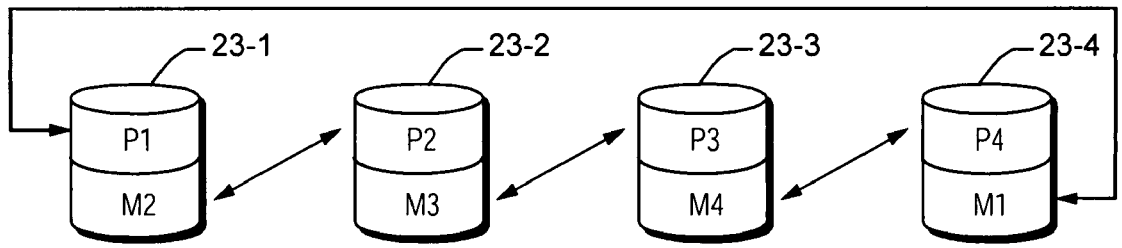
FIG. 3 illustrates one possible RAID-1 mirror configuration using partitions.
Figure 4:
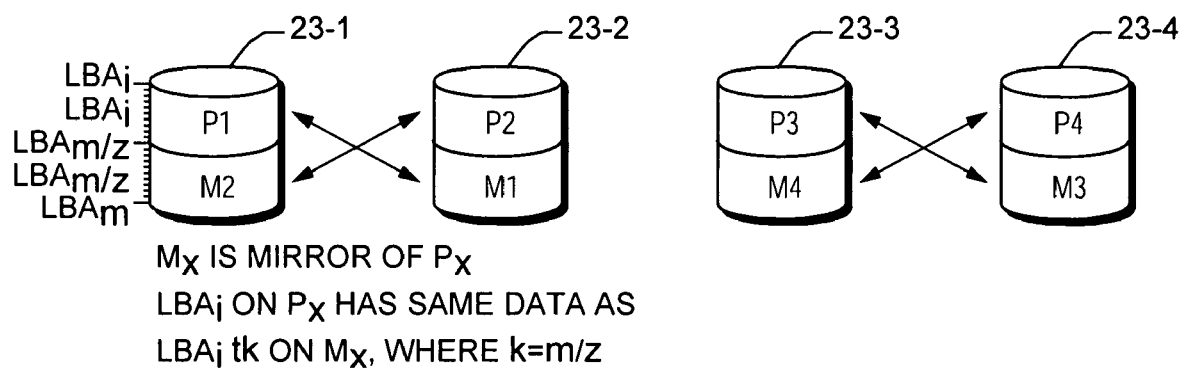
FIG. 4 is another RAID-1 configuration using partitions.

As part of its RAID processing, JPU 22 is also responsible for maintaining primary and mirror partitions on one or more of the disks 23 that it serves. Thus, the JPU 22 also maintains several partitions on each physical disk, including the primary partition, P, and mirror partition, M. These can be arranged in at least several scenarios, two examples of which are shown in FIGS. 3 and 4. In the first example of FIG. 3, the system may have four primary partitions, P1, P2, P3 and P4 that are in partitions of four physical disks 23-1, 23-22, 23-3 and 23-4. The remaining half of each disk 23 is then allocated to be a mirror. There is a mirror Mx associated with each primary partition Px.

The mirror, Mx, associated with each partition, Px, is however, not stored on the same physical disk. Primary P1 is located on physical drive 23-1 but its associated mirror M1 is located on physical drive 23-2. Thus, the mirror M2 for primary P2 is located on the same disk 23-1 as primary P1, the mirror M3 and primary P2 are on disk 23-2, mirror M4 and primary P3 on disk 23-3, and mirror M1 and primary P4 on disk 23-4.

An alternate arrangement is shown in FIG. 3, whereby the primary P1 and mirror M2 are on disk 23-1 and primary P2 and mirror M1 are on disk 23-2. In this configuration, primary P3 and mirror M4 share disk 23-3 and primary P4 and mirror M3 share disk 23-4.

Each physical disk typically has a number of 512 byte sectors that are ultimately identified by a physical location or address on the disk. As is a widespread practice, the disk controller 231 maintains Logical Block Address (LBA) for each of the disk sectors. The applications running on the JPUs 22 therefore access data on a disk 23 by specifying the LBA of a sector, and not the sector's physical location.

As shown next to disk 23-1 in FIG. 3, the m+1 LBAs on a given physical disk 23 are numbered contiguously from LBA 0 through LBA m. The LBAs run contiguously, such that the disk controller 231 generally assigns LBAs to sectors in such a way that sequentially accessing LBAs results in the fastest possible access rate. At least some sectors are reserved on each disk to be used as spares. The sparing process will be described in detail shortly.

It should also be noted here that each mirror Mx contains, in general, a copy of the contents of its associated primary Px. Thus, a logical block $LBA_i$ on Px contains the same data as $LBA_{i+k}$ on Mx where k=m/2. Partitions are generally made on each disk 23 such that half of the available LBAs are assigned to primary partitions (P1, P2, P3, or P4) and the remaining half are assigned to be mirrors (M1, M2, M3, or M4).

In accordance with well known RAID 1 disk mirroring procedures, when a particular primary Px in this system fails, the JPU 22 redirects all accesses destined for the failed primary disk Px to the disk's mirror Mx. After the failed disk Px has been replaced and its contents restored and updated as necessary, the system 10 can then redirect accesses destined for the failed disk to a replacement (which may be a new replacement drive for Px) instead of to its mirror Mx. In this fashion the storage system remains operational despite occasional disk failure.

However, in accordance with the present invention, disk failures are handled in a way which coordinates these standard RAID 1 type processing steps with sector failure processing executed by the JPU 22.

Figure 5:
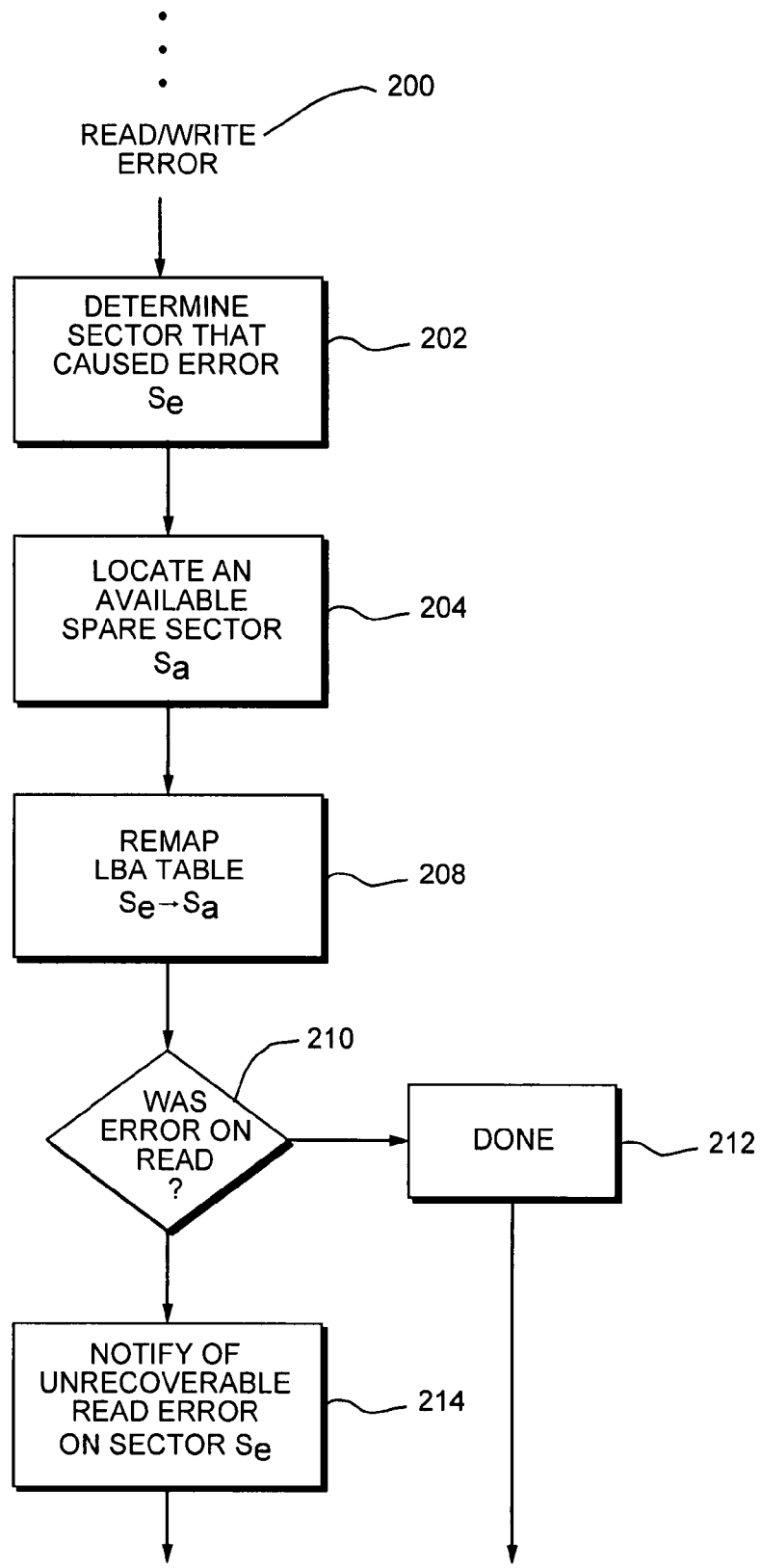
FIG. 5 is a flow chart of the steps performed by the disk controller.

FIG. 5 illustrates part of such a process that is implemented by the disk controller 231 when a sector error occurs. In a first state 200, a read or write error has been detected. A state 202 is next entered by the disk controller 231 to determine which sector caused the error. Once that sector, Se, is identified a state 204 can be entered in which an available spare sector, Ss can be found. The LBA table is then remapped in the disk controller 231 so that access that would be originally have been destined for a physical location in Sector Se are now remapped to the spare location in sector Ss. If the operation was a block write, then the processing is thus complete in state 212. However, from state 210, if the error has occurred on a read operation, if the error occurred on a read operation, then an unrecoverable read error has occurred. In particular, although the damaged sector, Se, has been remapped to a good sector Ss, the data for Sector Ss cannot be determined by the disk controller 231 acting alone. For example, if the error occurred on disk 23-1 on attempting to read data stored in partition P1, the read error cannot be recovered until data is obtained from the mirror M1 on disk 23-2 which would be under control of the JPU 22-2.

Figure 6:
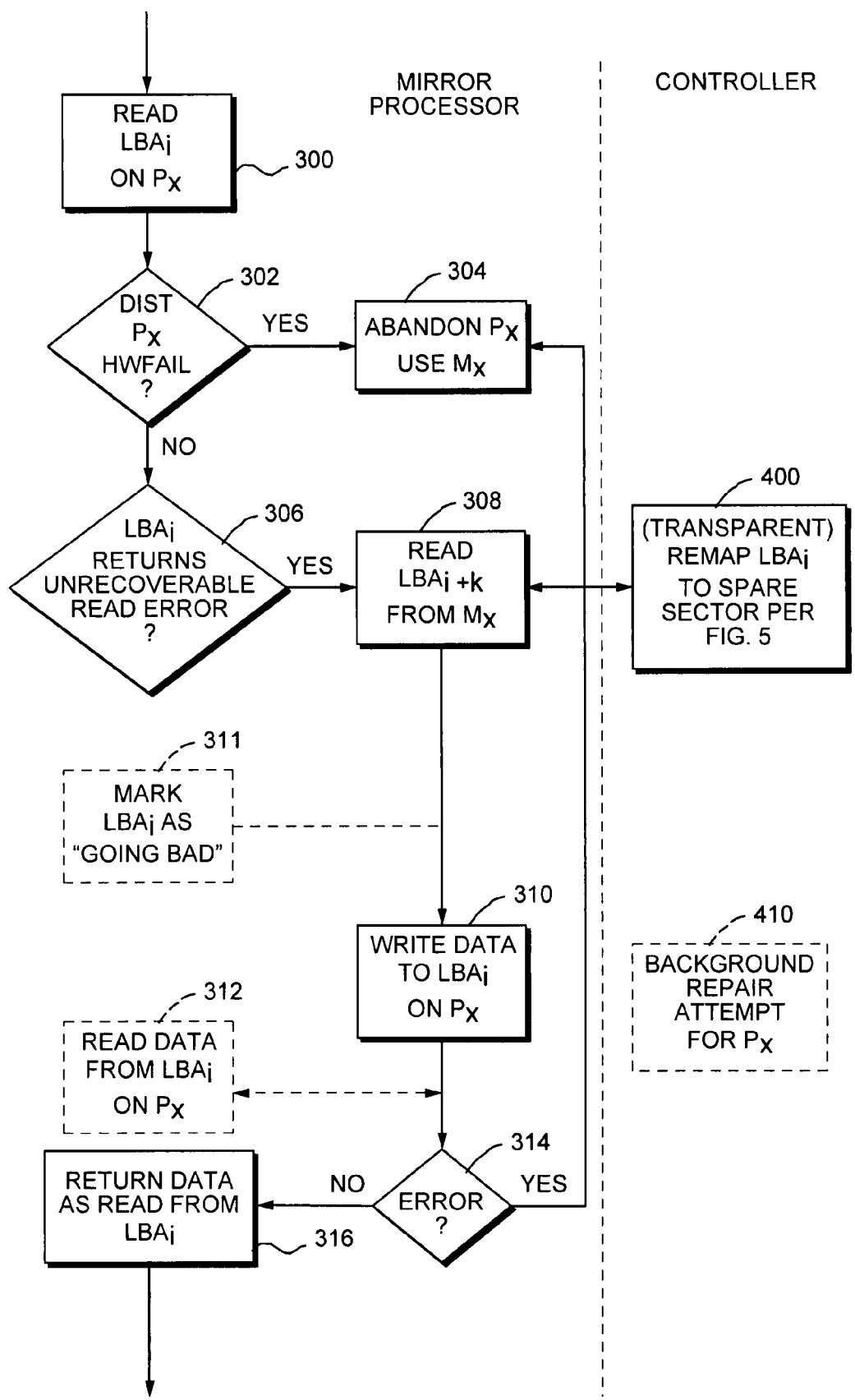
FIG. 6 is a flow chart of the RAID processing steps carried out by the JPU.

However, in accordance with the invention, this situation can be advantageously handled by the JPU (or other processor responsible for RAID) also executing an algorithm as shown in FIG. 6. Consider then the process that would potentially occur that causes and detects a read error failure and how such an error can be recovered from.

In a first state 300, a logical block address $LBA_i$ is attempted to be read from a particular primary partition, Px. In state 302, a test is made to determine if a gross hardware failure was returned by the read attempt. If so, a state 304 is entered in which the primary Px must be abandoned and the mirror Mx be used instead. A state 304 is thus maintained by having the JPU 22, associated with both the respective primary Px and mirror Mx then handle any further requests for data from primary Px, by supplying data instead from the mirror Mx.

However, if there is not a gross hardware failure in state 302, the process next determines if the read from $LBA_i$ returned an unrecoverable read error for a particular logical block. If this is the case, then in state 308 that logical block is read from the mirror. The corresponding logical block for $LBA_i$ will be the logical block at $LBA_{i+k}$ on the mirror Mx. This can be accomplished by the JPUs 22 responsible for the respective mirror Mx and the primary Px communicate with one another over the network connection.

While this process occurring in the JPUs 22, it will be recalled that the disk controller 231 associated with the failing primary Px will have started the remapping of $LBA_i$ to the spare sector as was described in FIG. 5. This process (state 400) thus occurs transparently to the mirror process running in each JPU 22.

In state 310, the JPU 22 attempts to write the data to $LBA_i$ on the primary Px. Assuming that state 400 in the disk controller 231 has been completed, the $LBA_i$ has now been remapped to a good sector. In state 314, a check is made for a write error. Optionally, at state 312, a read-after-write confirmation (where the $LBA_i$ is read from Px), can be executed to further confirm success of the remapping. If there is an error, the process returns to state 304 and the primary Px is abandoned, with the mirror Mx enabled.

In another optional step 311, the indicated sector may be marked as going bad, even if the write-back is successful.

From state 314, if a successful read has now occurred at $LBA_i$ on the primary Px, then the data can be returned in state 316 and normal processing can continue, and the assumption being that the error is now fixed.

As indicated in state 410 a background repair attempt can also be made for the primary Px. In particular, having now realized that unrecoverable read errors are occurring on disk Px, the disk controller 231 and/or mirror processing in JPU 22 can start a background process that regenerate the data for primary Px. If such regeneration fails, then other steps can be made to either associate the partition Px with other different physical media and/or provide error messages that prompt an operator to replace the abandoned disk with the physical disk.

In summary, the invention changes a standard RAID 1 process to permit recovery from unrecoverable read errors on individual disks. The process is to retrieve the unrecoverable data from a disk, Mx, that mirrors an offending disk, Px. The data is then attempted to be written back to the offending disk Px at the logical block $LBA_i$ that caused the error. An attempt is then made to read the data from the primary Px at the $LBA_i$ before abandoning the offending disk Px and restores using the mirror Mx. This process gives the disk controller associated with the primary Px which caused the error an opportunity to reassign $LBA_i$ to a spare sector, permitting the primary Px to be salvaged without switching to its mirror Mx.

Preventing the abandonment of a disk in this way provides an advantage in several ways. First, the disk which caused the error is prevented from becoming abandoned. Thus, its contents need not be replaced, nor must it be regenerated until a spare disk is installed in the system.

As a second advantage, performance is no longer compromised during the regeneration process. Extra disk accesses to access the mirror Mx are avoided because the error on this primary Px is handled in a way that avoids the need to regenerate proceeding to do so only when there is a gross hardware failure, and not simply for sector read errors. The entire distributed disk system's performance is improved as a result.

Furthermore, instead of treating unrecoverable read errors same as gross disk failures, the system can instead check to see whether the primary Px which caused the error can successfully reassign one of its LBAs. If, after reassignment, the LBA becomes readable and writable, then the system can retrieve the data that was known to be stored at that LBA, still using the primary Px rather than the mirror Mx.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for operating a Redundant Array of Inexpensive Disks (RAID) to recover from read errors comprising:
   in a RAID controller,
   receiving a report of an unrecoverable read error at a sector associated with a particular Logical Block Address ($LBA_i$) in a primary disk portion;
   retrieving data from a mirror disk portion associated with the primary disk portion that contains the $LBA_i$;
   writing the same data thereby retrieved to the $LBA_i$ on the primary disk portion for which the error was specified;
   and further comprising:
   in a disk controller,
   detecting the read error has occurred in the sector associated with the $LBA_i$ in the primary disk portion;
   notifying the unrecoverable read error at the $LBA_i$; and
   reassigning the sector originally associated with the $LBA_i$ for which the read error occurred to a spare sector in such a way that sequentially accessing the $LBA_i$ results in a fastest possible access rate.

2. The method of claim 1 further comprising:
   reading the data back from the $LBA_i$ on the primary disk portion; and
   if the data is read back from the $LBA_i$ without a further read error, not activating the mirror disk portion.

3. The method of claim 1 wherein the mirror disk portion is located at $LBA_{i+k}$ in another physical disk drive that is different from a physical disk drive on which the $LBA_i$ is stored.

4. The method of claim 1 further comprising:
   in the RAID controller, after detecting the unrecoverable read error by a disk controller, executing a background process for regenerating contents of the primary disk section that contains the $LBA_i$.

5. The method of claim 1 further comprising:
if the step of writing the same data retrieved from the mirror disk portion fails, then replacing the primary disk section that contains the $LBA_i$.

6. The method of claim 1 further comprising:
if the step of writing the same data retrieved from the mirror disk portion succeeds, then not activating the mirror disk portion for the $LBA_i$.

7. The method of claim 1 wherein the disk controller is located in a common assembly with disk hardware.

8. The method of claim 1 wherein the RAID controller is located in a processor that is a separate assembly from disk hardware.

9. An apparatus for operating a Redundant Array of Inexpensive Disks (RAID) to recover from read errors comprising:
a RAID controller connected to a disk controller, the RAID controller configured to receive a report of an unrecoverable read error at a sector associated with a particular Logical Block Address ($LBA_i$) in a primary disk portion, and in response thereto, retrieve data from a mirror disk portion associated with the primary disk portion that contains the $LBA_i$, and then write the same data thereby retrieved to the $LBA_i$ on the primary disk portion for which the error was specified; and
a disk controller connected to the primary disk portion, the disk controller configured to detect the read error has occurred in the sector associated with the particular $LBA_i$ in the primary disk portion, and in response thereto, notify the unrecoverable read error at the $LBA_i$, and further configured to reassign the sector originally associated with the $LBA_i$ for which the read error occurred to a spare sector in such a way that sequentially accessing the $LBA_i$ results in a fastest possible access rate.

10. The apparatus of claim 9 wherein the RAID controller is further configured to read the data back from the $LBA_i$ on the primary disk portion, and configured to prevent an activation of the mirror disk portion if the data is read back from the $LBA_i$ without a further read error.

11. The apparatus of claim 9 wherein the mirror disk portion is located at $LBA_{i+k}$ in another physical disk drive that is different from a physical disk drive on which the $LBA_i$ is stored.

12. The apparatus of claim 9 wherein the RAID controller is configured to execute a background process to regenerate the contents of the primary disk section that contains the $LBA_i$, after a disk controller is configured to detect the unrecoverable read error.

13. The apparatus of claim 9 wherein if writing the same data retrieved from the mirror disk portion fails, then the RAID controller is configured to replace the primary disk section that contains the $LBA_i$.

14. The apparatus of claim 9 wherein if writing the same data retrieved from the mirror disk portion succeeds, then the RAID controller is configured not to activate the mirror disk portion for the $LBA_i$.

15. The apparatus of claim 9 wherein the disk controller is located in a common assembly with disk hardware.

16. The apparatus of claim 9 wherein the RAID controller is located in a processor that is a separate assembly from disk hardware.

* * * * *